United States Patent [19]

Schmidt

[11] 4,417,191
[45] Nov. 22, 1983

[54] METHOD AND CIRCUIT FOR D.C. BRAKING A THREE-PHASE ASYNCHRONOUS MACHINE

[75] Inventor: Helmut Schmidt, Erlangen, Fed. Rep. of Germany

[73] Assignee: Siemens Aktiengesellschaft, Munich, Fed. Rep. of Germany

[21] Appl. No.: 268,161

[22] Filed: May 29, 1981

[30] Foreign Application Priority Data

Jun. 2, 1980 [DE] Fed. Rep. of Germany ....... 3020850

[51] Int. Cl.³ ............................................. H02P 3/24
[52] U.S. Cl. ..................................... 318/760; 318/758
[58] Field of Search ............... 318/757, 758, 759, 760, 318/761, 375

[56] References Cited

U.S. PATENT DOCUMENTS 3,153,182 10/1964 Choudhury ...................... 318/759
3,678,353 7/1972 March ............................ 318/375
4,311,948 1/1982 Brown et al. ..................... 318/757

FOREIGN PATENT DOCUMENTS 698812 11/1940 Fed. Rep. of Germany .

Primary Examiner—David Smith, Jr.
Attorney, Agent, or Firm—Kenyon & Kenyon

[57] ABSTRACT

A method for D.C. braking a three-phase asynchronous machine and a circuit arrangement useful in implementing the method. For braking, the first and third stator windings are separated from their phases and a pulsating direct current is caused to flow from the second phase to the first phase via a closed second switch and a diode. The third winding is short-circuited by a third switch which is connected in a loop with a current transformer; the loop carries a current induced by the turning rotor. A signal from the current transformer flows, via a limit indicator, to a digital logic member (OR). When the motor stops, short-circuit current flow is no longer detected, the second switch is opened and the circuit for producing direct current is automatically disconnected.

1 Claim, 1 Drawing Figure

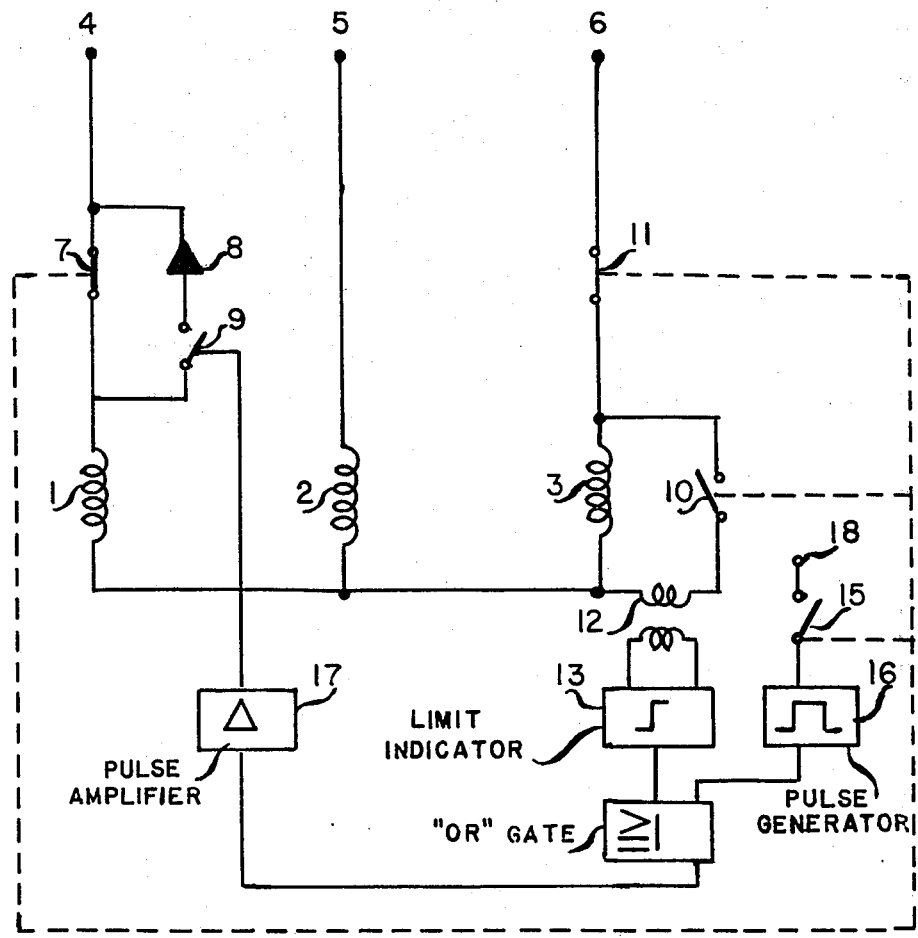

METHOD AND CIRCUIT FOR D.C. BRAKING A THREE-PHASE ASYNCHRONOUS MACHINE

BACKGROUND OF THE INVENTION

This invention relates to a method for D.C. braking a three-phase asynchronous maching having three Y-connected stator windings, in which, for braking the machine, the first and the second stator winding are acted upon by direct current and, at the same time, the third stator winding is short-circuited. The invention also relates to a circuit arrangement for implementing the method.

Such a method and a corresponding circuit arrangement is described in German Pat. No. 698 812. In that patent, for braking a three-phase asynchronous motor with Y-connected stator windings, one stator winding is short-circuited and the two other stator windings are connected in series and acted upon by direct current. In this method, the direct current is disconnected by delayed switching of a relay and a constant braking time results. Thus it may happen that the direct current is switched off before the braking is complete. In the alternative, the braking may have been finished before the direct current is switched off with the result that continued flow of direct current through the two stator windings produces a power loss until the windings are disconnected.

SUMMARY OF THE INVENTION

It is an object of the invention to provide a method and a circuit arrangement of the type described above in which the braking time for a three-phase asynchronous machine ends automatically when the rotor stops moving. According to the invention, this problem is solved by the provision that the flow of short-circuit current through the third stator winding is detected at the beginning of the braking operation and the flow of direct current in the series-connected stator windings is switched off when the short-circuit current ceases.

During the time that direct current flows through the first and the second stator winding, a field is generated by the rotor which induces a current in the short-circuited third stator winding.

This induced current causes the three-phase asynchronous machine to be braked. The short-circuit current flows through the third stator winding as long as the rotor of the three-phase asynchronous machine rotates and termination of the short-circuit current flow when the rotor stops signals that the braking has been accomplished. The termination of the short circuit current which results when the rotor stands still is used to cause the flow of direct current through the first and the second stator winding to be interrupted. The braking period is thus automatically terminated when the rotor stands still or is turning at a predetermined very low speed. With this method, a variable braking time is realized which corresponds in length to the actual time required to produce braking. Through the automatic interruption of the direct current flowing through the first and the second stator winding, losses are avoided which otherwise occur when, using a fixed braking period, the direct current is disconnected after the braking process is terminated. Furthermore, by the automatic conforming of the braking time to the duration of the actual braking process, switching off of the direct current before the braking process is finished and standstill or a permissible low level of rotation achieved, is prevented.

In a circuit for implementing the method, the first stator winding is connected to one phase of the power line by a circuit consisting of a first switch which is normally closed when the machine is operating. A series circuit, consisting of a rectifier valve and a second switch which is normally open when the machine is operating, is connected in parallel with the first switch. A third switch is shunt-connected across the third stator winding and is normally open when the machine is operating. The third stator winding is connected to a third phase of the power line by a fourth switch which is normally closed when the machine is operating. A current sensor connected in the circuit short-circuiting the third stator winding is connected to the input of a limit indicator. The output of the limit indicator is connected to the first input of a digital logic member with OR logic. The output of a tripping switch is coupled to the operative input of the first, the third, and the fourth switch and connected to the input of a pulse generator. The output of the pulse generator is fed to the second input of the digital logic member. The output of the digital logic member is connected to the operating input of the second switch.

BRIEF DESCRIPTION OF THE DRAWINGS

FIG. 1 is a schematic drawing of a circuit useful in the practice of the invention and showing the three Y-connected stator windings of a three-phase asynchronous machine. For simplicity, the rotor of the three-phase asynchronous machine is not shown.

DETAILED DESCRIPTION OF THE INVENTION

FIG. 1 shows stator winding 1 of a three-phase asynchronous machine which is connected, via a parallel circuit consisting of first switch 7 and a series circuit consisting of rectifier valve 8 and second switch 9, to phase 4 of a three-phase operating network. Rectifier valve 8 is, for instance, a diode. Stator winding 2 is directly connected to second phase 5 of the power line, and stator winding 3 is connected to third phase 6 via fourth switch 11. Stator winding 3 is shunted by third switch 10. First switch 7 and fourth switch 11 are normally closed when the three-phase asynchronous motor is running. Second switch 9 and third switch 10 are normally open when the motor is operating. The other ends of stator windings 1, 2, and 3 are connected together at the junction of the Y.

The primary winding of current transformer 12, which serves as a current sensor, is connected between the junction of stator windings 1, 2, and 3 and third switch 10. The secondary winding of current transformer 12 is connected to the input of limit indicator 13 which is, for instance, a monostable multivibrator. The output of limit indicator 13 is connected to one input of an OR stage, which serves as digital logic member 14. The output of tripping switching 15 is connected to the input of pulse generator 16. The output of pulse generator 16 is fed to the second input of digital logic member 14. The output of digital logic member 14 is connected, via pulse amplifier 17, to the operating input of second switch 9. Tripping switch 15 is further interlinked with the operating inputs of the first, the third, and the fourth switch 7, 10, 11. When the three-phase asynchronous motor is running, switches 7, 9, 10, 11 and 15 are in their normal operating positions which correspond to the switch positions shown in the drawing. A tripping device and an optional control and regulating device for running operation of the machine are not discussed in further detail in order to simplify the description.

At the start of a braking operation, switch 15 is tripped closed, thereby connecting pulse generator 16 and certain switch operating inputs to an auxiliary voltage source 18. By this application of voltage, first switch 7 and fourth switch 11, which are normally closed in running operation, are thereby opened, and third switch 10, which is normally open is closed. By opening switch 11, stator winding 3 is disconnected from phase 6 of the three-phase operating network. Stator winding 3 is short-circuited by the closing of switch 10. Stator winding 1 is disconnected from phase 4 by opening switch 7. Generation of the direct current required for braking is brought about by the closing of second switch 9 under control of OR gate 14 at the beginning of the braking operation to cause pulsating direct current to flow from phase 5 to phase 4 via stator windings 2 and 1, switch 9 and diode 8. The direct current flowing through stator windings 2 and 1 causes short-circuit currents to flow in the rotor, generating a rotor field. The rotor field induces a current in stator winding 3 which flows in the short-circuitive circuit consisting of stator winding 3, the primary winding of current transformer 12 and third switch 10, causing losses which lead to the braking of the rotor. As long as the rotor turns, a current is induced in stator winding 3. The short-circuit current flowing through stator winding 3, the primary winding of current transformer 12, and switch 10 induces a current in the secondary winding of current transformer 12 which is fed to limit indicator 13. Limit indicator 13 is set so that, in response to the currents which are induced in current transformer 12 and are caused by the rotation of the rotor, a first signal, for instance the digital signal ONE, is furnished to digital logic member 14 indicating the rotating condition of the rotor. If the rotor is standing still or is at a very low, predetermined speed, limit indicator 13 furnishes a second signal, for instance the digital signal ZERO, to digital logic member 14, The output signal of limit indicator 13 is fed to a first input of digital logic member 14. At the beginning of the braking operation, a short pulse of, for instance, several milliseconds duration is fed from pulse generator 16 to a second input of digital logic member 14, being activated by tripping switch 15. The pulse from pulse generator 16 corresponds to the digital signal ONE. This occurs before current induced by the rotor field flows through short circuited stator winding 3. During the short pulse, the induced current starts to flow through stator winding 3 and digital logic member 14 then receives the digital signal ONE via current transformer 12 and a limit indicator 13. Digital logic member 14, the output of which is coupled to the operating input of second switch 9, thus receives the signal ONE at the start of the braking operation, which signals the rotating condition of the rotor, from pulse generator 16, while limit indicator 13 still supplies the signal ZERO. When the induced current begins to flow through stator winding 3, logic member 14 receives the digital signal ONE from limit indicator 13. The pulse from pulse generator 16, the duration of which is predetermined, has in the meantime, come to an end, so that only the digital signal ZERO comes to logic member 14 from pulse generator 16. Digital logic member 14, which executes an OR function, controls second switch 9. As long as one or both of the two inputs of digital logic member 14 receives the signal ONE which indicates a turning rotor, second switch 9 is closed. When the rotor is standing still or the rotor speed has dropped below a predetermined value, limit indicator 13 delivers the digital signal ZERO because the short-circuit current in stator winding 3 has stopped or because the short-circuit current has dropped below the predetermined limit. Since pulse generator 16 also delivers the digital signal ZERO after the pulse supplied at the start of the braking operation, each of the two inputs of logic member 14 now receives the signal ZERO. Digital logic member 14 thereupon delivers the output signal ZERO, causing the second switch 9 to open and the flow of pulsating direct current from phase 5 to phase 4 to be interrupted. With the end of braking as signalled by the standstill of the rotor or the predetermined low rotor speed, the direct current flow through stator windings 1 and 2 is thus automatically disconnected by the switching arrangement.

As discussed above, energy losses caused by the continued flow of the direct current when a fixed, predetermined braking time is used, are therefore impossible. Through the use of this method and the described circuit arrangement, the braking time is made independent of changing load conditions at the driving machine. The braking time is always adapted automatically to the braking time actually required. The circuit arrangement ensures reliable braking of a three-phase asynchronous machine down to standstill. For large numbers of switching cycles, a lower operating temperature of the motor is obtained. A series-connected protective motor circuit breaker can be matched better to the motor if the latter is operated in the switched mode, which increases safety against overload if no thermistor protection is provided. The determination of rotor speed by means of a current tranformer which acts as a current sensor requires a lesser amount of technical means than other speed sensors such as tachometer generators or optical scanners.

The parallel circuit consisting of first switch 7 and series-connected rectifier 8 and second switch 9 can be realized by an antiparallel connection of two thyristors which are addressed and extinguished together. Likewise, switches 10 and 11 may each consist of an antiparallel circuit of two thyristors which are addressed and extinguished together. Furthermore, each of the switches 7, 9, 10, and 11 can be realized as a solid-state relay.

What is claimed is:

1. In a circuit for the direct current braking of a three-phase synchronous machine having first, second, and third Y-connected stator windings adapted to be connected to a three phase power supply by causing direct current to flow in the first and second windings when braking and, at the same time, short-circuiting the third winding, the circuit comprising:
   a parallel circuit coupling the first stator winding to a first phase of the power supply, the parallel circuit comprising a normally closed first switch and a rectifier valve connected in series with a normally open second switch,
   a normally closed fourth switch coupling the third stator winding to a third phase of the power supply, and
   a normally open third switch coupled across the third stator winding,
   the first, second, third, and fourth switches each having an operating input, the improvement comprising:
  a current sensor coupled between the third switch and the third stator winding and having an output;
  a limit indicator having an input coupled to the output of the current sensor and having an output;
  a tripping switch having an output coupled to the operating input of the first, third and fourth switches and to the input of the pulse generator;
  a pulse generator having an input and an output; and
  a digital logic member having OR logic, the logic member having an input coupled to the output of the limit indicator, an input coupled to the output of the pulse generator, and an output coupled to the operating input of the second switch.

* * * * *